April 18, 1961     W. J. DUNN ET AL     2,980,821
DISPLAY SYSTEM

Filed Dec. 31, 1957     3 Sheets-Sheet 1

INVENTORS
WILLIAM J. DUNN
CHARLES A. ANKENBROCK
BY     MARTIN RABB

Darby & Darby
ATTORNEYS

United States Patent Office 2,980,821
Patented Apr. 18, 1961

2,980,821
DISPLAY SYSTEM

William J. Dunn, Teaneck, Charles A. Ankenbrock, Paramus, and Martin Rabb, East Paterson, N.J., assignors, by mesne assignments, to Fairchild Camera and Instrument Corporation, Long Island City, N.Y., a corporation of Delaware Filed Dec. 31, 1957, Ser. No. 706,483

11 Claims. (Cl. 315—24)

This invention relates to a display system, and more particularly to a circuit which expands a selected portion of the display for closer study.

In order to simplify the explanation of the operation and uses of our invention, the general description will be conducted in terms of a radar system, although this explanation is not to be construed as limiting our invention to this usage. It is well known that a "search" radar antenna rotates continuously until the display device associated therewith reveals the presence of an object it is desired to study or follow. The antenna rotation is thereupon changed from a continuous rotating movement to an angular reciprocating movement, known as "nodding," which covers only the small angular section in which the object is located. Whereas continuous antenna rotation produces on the display device a presentation which uses the entire width thereof, the presentation produced by the nodding movement occupies only a small segment. It is therefore desirable to expand this small segment to utilize the entire viewing area.

Many systems have been suggested for this expansion but most of them are extremely complicated, and invariably introduce a jitter which makes minute study difficult.

It is therefore the principal object of our invention to provide an improved sector expander.

It is another object of our invention to provide a sector expansion which is relatively simple, and free of jitter.

The attainment of these objects and others will be realized from the following specification, taken in conjunction with the drawings, in which, Fig. 1a illustrates the prior art, and Fig. 1b illustrates the voltage waveform associated therewith;

Fig. 2a illustrates the basic concept of our invention, and Fig. 2b illustrates associated waveforms;

Figs. 3a and 4a disclose improved embodiments of our invention, while Figs. 3b and 4b disclose the resultant voltage waveforms;

Figure 1A:
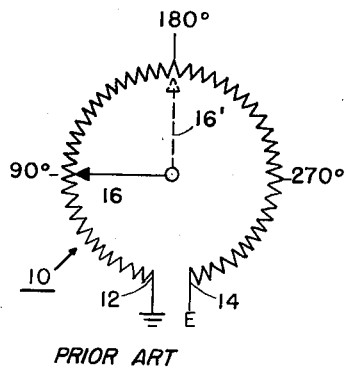

Referring now to Fig. 1a, which shows the prior art, a potentiometer 10 is shown as having one end 12 connected to ground, and its other end 14 connected to a potential, E. A rotatable wiper or slider 16 is connected either directly or through a servo system to the radar antenna, and rotates therewith. In this way, the antenna position designated as 0° corresponds to a given slider position, which is also designated as 0°. As the antenna rotates, slider 16 also rotates, starting at 0° and making a complete revolution for every revolution of the antenna. For clarity, slider 16 will be designated as the "antenna position indicator" slider, or "antenna" slider.

As antenna slider 16 rotates, it picks up from potentiometer 10, a potential which determines the horizontal position of the spot on the cathode ray tube display device; i.e., the greater the picked up potential the further the spot moves from its starting point.

Due to mechanical difficulties it is impossible for the two ends of potentiometer 10 to coincide, thus resulting in a small gap. In terms of the radar antenna, this gap means that when the antenna rotates from approximately 358° to 360°, slider 16 is incapable of producing a signal—therefore introducing a blind spot.

It is therefore apparent that when this type of apparatus is used for searching, there is a blind spot of about 2 degrees which is always at the same point.

Figure 1B:
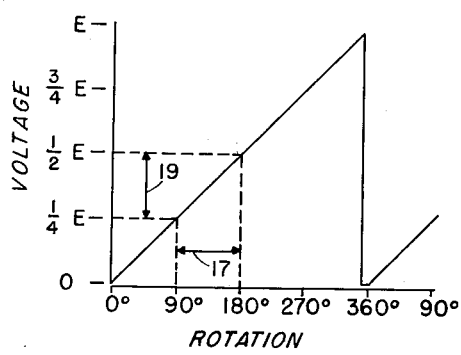

Fig. 1b shows the voltage picked up by antenna slider 16 during its rotation. At a position corresponding to 0° (grounded end 12 of Fig. 1), antenna slider 16 is at ground potential and therefore picks up a voltage of zero. As the antenna, and therefore antenna slider 16, rotates, the slider sweeps through a complete circle of 360°. The 358° position produces a voltage E which corresponds to maximum spot deflection. Since potentiometer 10 is preferably linear, the 0° position produces no voltage, the 90° position corresponds to E/4, the 180° position corresponds to E/2, the 270° position to 3E/4, and the 358° position to E. Since the antenna slider leaves the potentiometer at end 14, the 358° to 360° interval produces no voltage. Of course the 360° position coincides physically with the 0° position. The resultant prior art voltage waveform for 1¼ rotations of antenna slider 16 is shown in Fig. 1b, attention being directed to the blind spot between the 358° and 360° positions.

If the object to be studied is located at a position corresponding to 135°, it would be desirable for the nodding to take place over a small angle which is centered at 135°. For convenience in explanation, a nodding angle of 90° has been chosen, thus permitting coverage of 45° on each side of the object's position. The study sector therefore occurs between 90° and 180°, shown in Fig. 1a as being between the solid line representation of slider 16 and the dotted representation 16'. It may be seen that in Fig. 1b the range of angular movement between 90° and 180° is shown by arrow 17; while the voltage produced would vary between E/4 and E/2 shown by arrow 19. The presentation produced by this study sector would occupy only a one-quarter portion of the faceplate, and it is this portion which it is now desired to expand.

Figure 2A:
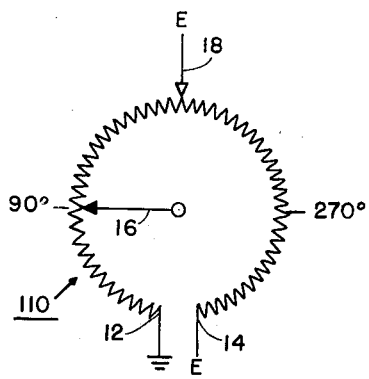
Figure 2B:
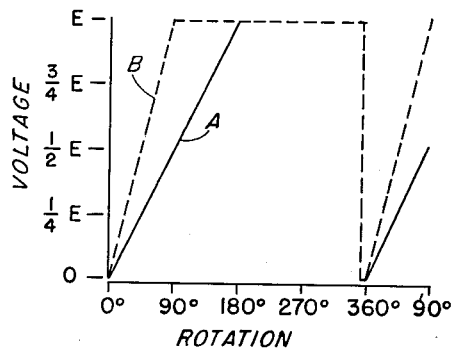

Referring now to Fig. 2a there is illustrated the basic concept of our invention. Instead of having the voltage E applied to only the end 14 of the potentiometer 110, the voltage is also applied to a second "voltage applying" or "energizing" slider 18 which is positionable at any point of potentiometer 110. If energizing slider 18 were to be positioned at end 14, the result corresponds exactly with the prior art as is shown in Fig. 1b. If, however, energizing slider 18 is positioned at the midpoint, or 180° position, of potentiometer 110, full-scale spot deflection is produced when antenna slider 16 rotates from 0° to 180°. Waveform A of Fig. 2b illustrates the voltage variations as antenna slider 16 rotates in accordance with antenna movement. When antenna slider 16 is at the 180° position the full voltage E is available. Any slider position beyond 180° (between 180° and 360°) produces exactly the same voltage E as obtained at the 180° point. A cathode ray tube light spot which is being deflected by voltage from slider 16 therefore moves entirely across the faceplate during the first half revolution of slider 16, and the spot then remains at the right edge of the faceplate for the balance of the rotation of slider 16.

Dotted waveform B of Fig. 2b illustrates the waveform produced when energizing slider 18 is moved to the 90° position. In this case the full voltage E is available when antenna slider 16 is at the 90° point, and this voltage remains constant for the rest of the rotation for the slider. It is therefore apparent that in this second case the sector from 0° to 90° will be portrayed across the entire width of the faceplate. As illustrated in Fig. 2, movement of the antenna between the 0° and the 180° position, or the 0° and the 90° position, will produce a full scale expanded presentation for these sectors.

It will be realized from the discussion of Fig. 2, that while sector expansion is possible under this system, expansion is for a sector which starts at the 0° position, and that the 358°–360° interval is still blind.

Figure 3A:
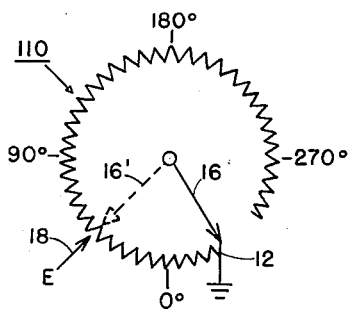

Fig. 3a shows one way in which the study section may be expanded for any portion of the rotation, and may also produce a signal for the 358°–360° interval. To simultaneously illustrate these two factors, assume that an object has been located at a point corresponding to the antenna's 359° position, and that nodding takes place over an angle of 90°, 45° to each side, i.e., that is from 314° to 44°. Potentiometer 110 is bodily rotated until its ground end 12 corresponds to the 314° antenna position. Energizing slider 18 is now moved to a position corresponding to the 44° antenna position. Nodding now causes antenna slider 16 to cover the sector between the 314° and 44° positions. When antenna slider 16 is at its 314° position, it is at ground potential and picks up no voltage. As antenna slider 16 moves to its 44° position, it picks up a voltage which progressively increases to the value of E, which provides full-scale deflection. The voltage waveform which would be picked up by continuous rotation of antenna slider 16 with the bodily rotated potentiometer may be seen in Fig. 3b. Waveform C shows that the expanded study portion includes the 358°–360° interval, and that the voltage picked up varies between 0 and E volts. Spot deflection therefore occupies the entire width of the display device.

From the foregoing it will be seen that due to our invention, it is possible to not only provide an expanded presentation, but to scan the portion which was previously blind. If desired, the potentiometer may be rotated after each scansion, so that the blind spot will sequentially occur at different points, thus permitting search in all directions, including those which were previously blind.

Figure 4A:
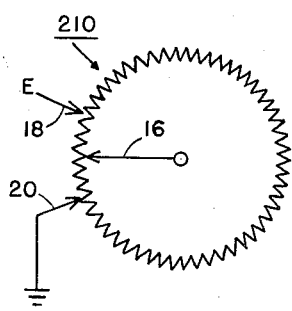
Figure 4B:
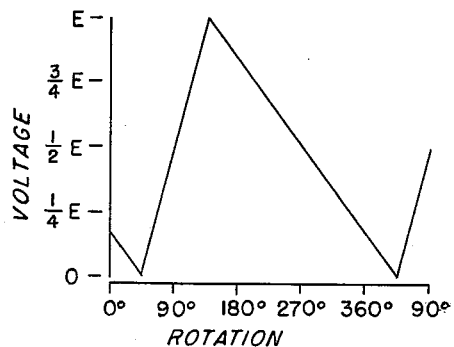

Fig. 4a shows an embodiment of our invention which achieves the same results electrically. It comprises the same basic elements, a potentiometer 210 which is now continuous, antenna slider 16 which rotates with the antenna, a positionable voltage applying slider 18, and an additional positionable slider 20 which is connected to ground. Grounding slider 20 is positioned at the precise point where the expanded sector is desired to start, say 45°, while energizing slider 18 is positioned at the precise point where the sector is desired to end, say 135°. As antenna slider 16 moves in accordance with the movement of the antenna, it picks up a voltage which varies from zero at the position 45° (established by grounded slider 20), to E at the position 135° (established by energizing slider 18). The resultant movement therefore produces a voltage variation which starts at 0 volts thus positioning the light spot at the left hand side of the presentation, and ends with a voltage of E thus moving the light spot at the extreme right hand side of the presentation to produce full scale deflection for the desired sector, whether it be 90° or any other portion of the revolution. The resultant waveform for continuous rotation is shown in Fig. 4b.

The waveforms as hereinabove presented, related to continuous antenna slider movement in a clockwise direction. The positive going slanting lines indicate increasing potentials which moved the light spot from its initial position at the left hand side of the presentation to the right hand side. The horizontal lines of the waveforms indicate that the spot is at rest.

To be more explicit, waveform A of Fig. 2b indicates that when the antenna slider 16 is at its 0° position, the light spot is at the left hand side of the presentation. As antenna slider 16 rotates to its 180° position, the light spot moves across the entire width of the cathode ray tube faceplate. It rests at the right hand edge while antenna slider rotates from its 180° position to its 358° position. During rotation of antenna slider from its 358° to its 360° (or 0°) position, the change in potential shown by the almost vertical line, causes the light spot to sweep quickly back to the left hand edge in preparation for another cycle.

Figure 3B:
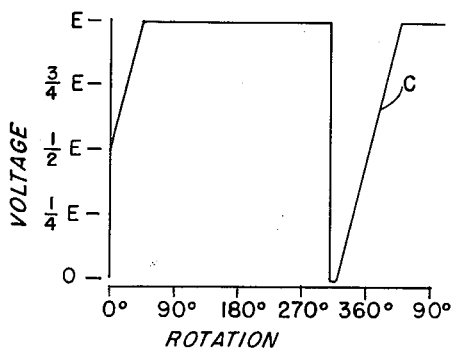
Figure 5:
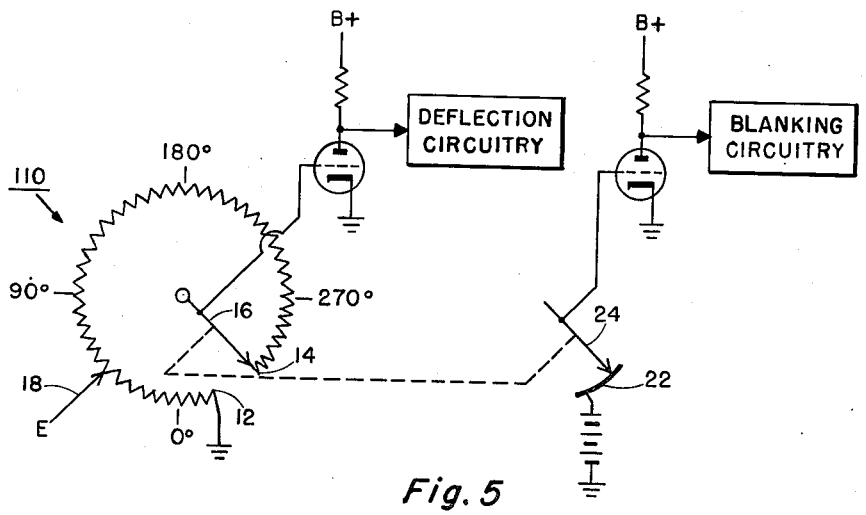
Figs. 5 and 6 show apparatus for blanking out the retrace.

The rapid spot movement from right to left is known as the "retrace," and in Figs. 1b, 2b and 3b the vertical portion represents the movement of the spot from its right hand position to its starting point. This retrace, being extremely fast since it takes place during an extremely short interval, produces only a faint line, which may, however, be objectionable under certain conditions. In order to prevent this visible retrace line, it is desirable to "blank out" the tube by cutting off the electron beam during the retrace interval. This blanking is readily accomplished by the apparatus shown in Fig. 5. A second potentiometer-like structure is utilized, said structure having a "blanking" conductor 22 positionable to occupy on the second potentiometer-like structure, a space corresponding to the blind spot on the first potentiometer. The potentiometer type structure also has a "cutoff" slider or wiper 24 ganged to move in synchronism with antenna slider 16, wiper 24 being connected through suitable circuitry to control the blanking of the display device. One suitable mode of operation is to utilize a potential applied to conductor 22. Thus, as antenna slider 16 leaves end 14 and moves to end 12, retrace occurs. Simultaneously, cutoff slider 24 contacts blanking conductor 22, and the control signal so produced operates on the blanking circuitry so that the tube is blanked out during this interval. When antenna slider touches end 12, cutoff slider 24 leaves blanking conductor 22, and the control signal is removed from the blanking circuitry.

Figure 6:
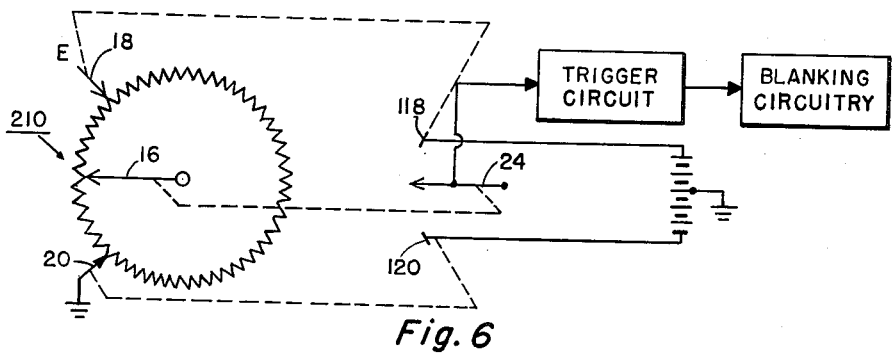

While potentiometer 210 of Fig. 4 does not have a gap, blanking may be introduced in various ways. One satisfactory method illustrated in Fig. 6 is similiar to that previously described. It also uses a second potentiometer type structure having a "cutoff" slider 24 ganged to rotate with antenna slider 16. However, the apparatus of Fig. 6 uses two contacts 118 and 120 for achieving blanking. As sliders 18 and 20 are positioned, they automatically position contacts 118 and 120 to be touched by cutoff slider 24. Each contact therefore produces a control signal, which may be of suitable amplitude and polarity to control a trigger circuit which in turn energizes the blanking circuitry to establish the display and blanked out intervals for the cathode ray tube.

The retrace portion of any display inherently introduces an extremely small sector which is not available for presenting a display. Due to our invention, however, every portion of the azimuth may be scanned, thus minimizing the danger of a blind spot.

It will be realized, af course, that as the energizing and grounding sliders 18 and 20 approach each other to establish a narrower scan sector, the section of the potentiometer between them may become overloaded. Mechanical stops or spacers may be incorporated into either the potentiometer or slider structure to act as a safeguard.

Figure 7:
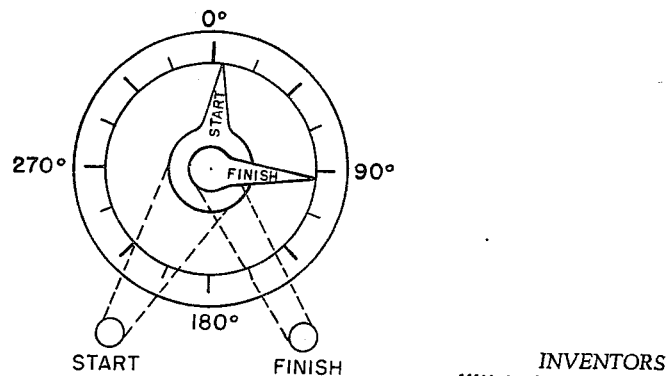
Fig. 7 illustrates a device for indicating which sector is being expanded.

In order to inform the operator which sector is being expanded, it may also be desirable to utilize a degree-graduated scale such as is shown in Fig. 7. This apparatus has a pointer marked "Start" which is geared or otherwise ganged to grounding slider 20 or to the rotating potentiometer so that the actual start of the sector may be indicated. Similarly, another pointer marked "Finish" may be geared to the energizing slider 18 to indicate the end of the sector.

Having disclosed the principles and several embodiments of our invention, we desire to be limited only by the following claims.

What is claimed is:

1. Apparatus by producing a trace which is presented on an indicator by deflection means comprising a potentiometer having ends which are separated, means for connecting one of said ends to a reference potential point, said potentiometer having a first movable wiper which is connected to said deflection means and a second wiper which is positionable on the body of said potentiometer, a source of voltage electrically connected across said reference potential point and said second wiper, said first wiper applying a sweep voltage to said deflection means as it moves on the body of said potentiometer between said one end and said second wiper, the position of said second wiper determining the speed of said sweep voltage, said first wiper causing a blind spot to be produced on said trace as it moves between the separated ends of the potentiometer, a second structure having a contact which corresponds in position to the separation between the ends of said potentiometer, an energizing blanking signal source connected to said contact, said second structure having a third wiper which is connected to move with said first wiper, blanking circuit means connected to said third wiper, said blanking circuit being energized from said blanking signal source to blank out the trace when said first wiper moves between the separated ends of the potentiometer.

2. The device of claim 1 wherein the body of the potentiometer is movable with respect to said wipers while still maintaining correspondence between the separated ends of the potentiometer and the contact of said second structure.

3. Apparatus for producing a trace which is presented on an indicator by a deflection means comprising a potentiometer having ends which are separated, said potentiometer also having first and second movable wipers which are positionable on the body of said potentiometer and a first contact connected to one end thereof, means for connecting said first contact to a first reference potential point, a second source of reference potential of greater magnitude than said first reference potential point connected to said second wiper, said first wiper applying a sweep voltage to said deflection means as it moves on the potentiometer between the first contact and the second wiper, the position of said second wiper with respect to said first contact determining the speed of said sweep voltage, said first wiper causing a blind spot to be produced on said trace as it moves between the separated ends of the potentiometer, a second structure which has a contact which corresponds in position to the separation between the ends of said potentiometer, an energizing blanking signal source connected to said contact, said second structure having a third wiper which is connected to rotate with said first wiper, blanking circuit means connected to said third wiper, said blanking circuit means being energized from said blanking signal source to blank out the trace when said first wiper moves between the separated ends of the potentiometer.

4. Apparatus for producing a trace which is presented on an indicator by deflection means comprising a continuous wound potentiometer, said potentiometer having a first wiper for continuous movement and second and third wipers which are positionable on the body of said potentiometer, means for connecting said second wiper to a first reference potential point, means for connecting said third wiper to a second reference potential point, the potential maintained at the second reference potential point being of greater magnitude than the potential maintained at the first reference potential point, said first wiper applying a sweep voltage to said deflection means as it moves on the potentiometer between said second and third wipers, the position of said third wiper with respect to said second wiper determining the speed of said sweep voltage, a second structure having first and second contacts which are positionable on said second structure to respectively correspond to the position of said second and third wipers, a fourth wiper for said second structure connected to rotate with said first wiper, blanking circuit means connected to said fourth wiper and said indicator, an unblanking signal source connected to said first contact, a blanking signal source connected to said second contact, said blanking circuit being energized to blank out the trace as said first wiper moves on the potentiometer from said third wiper back to said second wiper thereby blanking out the trace during the period when the sweep voltage is not being produced.

5. The device of claim 4 including a sector start indicator for setting the position of said second positionable wiper.

6. The device of claim 4 including a sector end indicator for setting the position of said third positionable wiper.

7. Apparatus for producing an expanded trace on an indicator having deflection means for producing the trace comprising a potentiometer having ends which are separated, means for connecting one of said ends to a reference potential point, said potentiometer having a first movable wiper connected to said deflection means and a second wiper which is positionable on the body of said potentiometer, a source of voltage electrically connected across said reference potential point and said second wiper for energizing said deflection means, said first wiper applying a sweep voltage to said deflection means to produce the trace as it moves on the potentiometer between said one end and said second wiper, the position of the second wiper on said potentiometer determining the speed of the trace.

8. Apparatus as described in claim 7 wherein the body of said potentiometer is movable with respect to said wipers.

9. Apparatus for producing an expanded trace on an indicator having deflection means for producing the trace comprising a potentiometer, said potentiometer having a first movable wiper connected to said deflection means and second and third wipers which are positionable on the body of said potentiometer, means for connecting said second wiper to a reference potential point, a source of potential electrically connected across said reference potential point and said third wiper for energizing said deflection means, said first wiper applying a sweep voltage to said deflection means to produce the trace as it moves on the potentiometer between the second and third wipers, the position of said third wiper with respect to said second wiper determining the speed of the trace and the location of the second and third wipers on the potentiometer determining the portion of the trace which is expanded.

10. Apparatus as set forth in claim 9 wherein said potentiometer is continuous.

11. Apparatus as set forth in claim 10 wherein said second wiper is connected to ground potential.

References Cited in the file of this patent

UNITED STATES PATENTS

| | | |
|---|---|---|
| 586,864 | Pieper | July 20, 1897 |
| 2,400,791 | Tolson | May 21, 1946 |
| 2,411,030 | Ryder | Nov. 12, 1946 |
| 2,551,989 | Wilson | May 8, 1951 |
| 2,632,864 | Hunter | Mar. 24, 1953 |
| 2,774,934 | Gitzendanner | Dec. 18, 1956 |
| 2,785,261 | Roberts | Mar. 12, 1957 |
| 2,786,122 | Strain | Mar. 19, 1957 |
| 2,858,475 | Blake | Oct. 28, 1958 |

UNITED STATES PATENT OFFICE
CERTIFICATE OF CORRECTION

Patent No. 2,980,821  April 18, 1961

William J. Dunn et al.

It is hereby certified that error appears in the above numbered patent requiring correction and that the said Letters Patent should read as corrected below.

Column 3, lines 70 and 71, for "positon" read -- position --; column 5, line 4, for "by" read -- for --.

Signed and sealed this 5th day of December 1961.

(SEAL)
Attest:

ERNEST W. SWIDER  
Attesting Officer

DAVID L. LADD  
Commissioner of Patents

USCOMM-DC